US008314772B1

(12) United States Patent  (10) Patent No.: US 8,314,772 B1
Coe  (45) Date of Patent: Nov. 20, 2012

(54) COMPUTER MOUSE

(76) Inventor: Stanley S. Coe, Raleigh, NC (US)

( * ) Notice: Subject to any disclaimer, the term of this patent is extended or adjusted under 35 U.S.C. 154(b) by 726 days.

(21) Appl. No.: 12/549,581

(22) Filed: Aug. 28, 2009

(51) Int. Cl.
G06F 3/033 (2006.01)

(52) U.S. Cl. ........................................ 345/163; 345/167
(58) Field of Classification Search .................. None
See application file for complete search history.

(56) References Cited

U.S. PATENT DOCUMENTS

| | | |
|---|---|---|
| 3,541,541 A | 11/1970 | Engelbart |
| 4,797,665 A | 1/1989 | Ida et al. |
| 5,313,229 A | 5/1994 | Gilligan et al. |
| 5,313,230 A | 5/1994 | Venolia |
| 5,374,942 A | 12/1994 | Gilligan et al. |
| 5,473,344 A | 12/1995 | Bacon et al. |
| 5,576,733 A | 11/1996 | Lo |
| 5,726,683 A | 3/1998 | Goldstein |
| 5,774,113 A | 6/1998 | Barnes |
| 5,894,302 A | 4/1999 | Scenna et al. |
| 5,912,661 A | 6/1999 | Siddiqui |
| 5,963,197 A | 10/1999 | Bacon et al. |
| 5,990,871 A | 11/1999 | Adams et al. |
| 6,005,553 A | 12/1999 | Goldstein et al. |
| 6,124,846 A | 9/2000 | Goldstein et al. |
| 6,130,664 A | 10/2000 | Suzuki |
| 6,188,389 B1 | 2/2001 | Yen |
| 6,246,392 B1 | 6/2001 | Wu |
| 6,285,355 B1 | 9/2001 | Chang |
| 6,300,941 B1 | 10/2001 | Segalle |
| 6,348,913 B1 | 2/2002 | Cho |
| 6,362,811 B1 | 3/2002 | Edwards et al. |
| 6,492,975 B1 | 12/2002 | Weiss |
| 6,522,320 B1 | 2/2003 | Chou |
| 6,532,002 B2 | 3/2003 | Segalle |
| 6,563,490 B1 | 5/2003 | Wang et al. |
| 6,590,564 B1 | 7/2003 | McLoone et al. |
| 6,664,947 B1 | 12/2003 | Vinogradov |
| 6,670,947 B2 | 12/2003 | Smyth |
| 6,781,573 B1 | 8/2004 | Honma et al. |
| 7,006,075 B1 | 2/2006 | Olson |
| 7,009,597 B1 | 3/2006 | Ames |
| 7,170,493 B2 | 1/2007 | Lu |
| 7,385,587 B1 | 6/2008 | Adapathya et al. |
| 7,808,479 B1 * | 10/2010 | Hotelling et al. ............. 345/163 |

* cited by examiner

Primary Examiner — Muhammad N Edun
(74) Attorney, Agent, or Firm — Coats & Bennett, P.L.L.C.

(57) ABSTRACT

A computer mouse including a base and rotatably coupled controller that permits only circular arc motions where only two radii of curvature are permitted and the radii differ in length. Hand translation is prevented by the device. A contoured hand engaging surface on the controller includes a raised palm seat with a spiral hand seat around the palm seat. Ergonomically-configured selectors are described. The hand motions permitted by the mouse are constrained by a toroidal shape at the interface between a base and a rotatably-movable controller. Selectors include one or more one finger activated keys mechanically linked to an internal electrical selector switch. A thumbwheel selector is also located in the controller.

25 Claims, 14 Drawing Sheets

COMPUTER MOUSE

FIELD OF THE INVENTION

The invention pertains generally to a method and device to assist in entering and manipulating computer data. More particularly, the invention pertains to a mouse for sensing hand movements, producing hand movement data, and communicating with a computer or similar device for positioning a cursor and entering commands to an application running on the computer.

BACKGROUND

The use of computers and many other electronic devices has become generally dependent on the use pointing devices for communicating, usually in connection with a graphical computer interfaces. Pointing devices are used in general office computing such as word processing, spreadsheet analysis, and data base management. Similarly, pointing devices are used in graphical document preparation and design such as may be done by design engineers, product designers, and architects who use computer-aided design and drafting applications. Additionally, pointing devices of various types are used as remote controls in such areas as vehicle controls, industrial and consumer machine and appliance controls, mapping systems, entertainment systems, and many other to facilitate visual interaction between a user and a computer or computer-based system.

A common pointer device is the so-called "mouse." The traditional mouse comprises basically a movable element that can be positioned by hand at arbitrary locations usually on a planar target surface. The mouse can electronically communicate mouse movements in Cartesian coordinates to a computer. The mouse typically also includes one or more control buttons, selectors, or other actuators that can be used to send commands to applications running on the computer. For example, the mouse might include a button with which the user can command a computer application to "select" an item pointed to on the computer display.

The mouse gets its name from a perceived mouse-like similarity of the body of the device with a communication cable extending from one end. However, various forms of wireless "mice" are available, and yet the terminology persists.

There exist other forms of computer pointing and commanding devices such as trackballs, joysticks, light pens, touch pens, and the like which provide the same or very similar functionality as a traditional mouse. Likewise, pointing and commanding devices such as touch pads, touch screens, and the like offer mouse-like capabilities. However, the more traditional mouse-type devices remain in use.

In 1970, Douglas Engelbart was awarded a patent for an X-Y Position Indicator for a Display System (U.S. Pat. No. 3,541,541), which, along with the development of the graphical interface, provided for operating a computer without typing commands. The Engelbart system, which includes a mouse, was configured to communicate to a computer the instantaneous position of the mouse moving on a planar work surface with planar hand movements. The Engelbart mouse was capable of digitally encoding signals from friction-driven orthogonal mouse wheels as the mouse was moved about on the work surface. There have been many subsequent improvements in encoding technologies for detecting motion of a mouse on a work surface and transmitting a signal to accordingly position a cursor on a computer display. The Engelbart configuration of friction-driven, orthogonally angled tracking wheels was followed by improvements such as a friction driven spheres or balls, the rotation of which were encoded via friction driven discs or optical detectors. The friction driven ball then gave way to technologies for directly sensing the motion of the mouse relative to the supporting work surface by optical means. These technologies eliminated problems with friction failure that sometimes occurred while the mouse was in motion. Such developments improved the sensitivity and reliability of motion sensing in the context of computer input devices.

As prior art mouse devices developed, scroll wheel actuators were introduced. The scroll wheel was generally acknowledged as a potential Z-axis positioner for 3-D graphical work. It is used more generally, however, as a special selector or actuator for performing menu scrolling.

Some mouse-type devices based on non-planar hand movement have been developed. For example, Barnes (U.S. Pat. No. 5,774,113) disclosed a three-directional mouse on a pedestal. The Barnes device comprises a spherical ball resting on an elevated support and associated electronics that detect the angular orientation of the ball relative to the support. A button was provided on the Barnes device for signaling the computer to move an on-screen icon in the direction indicated by the current ball orientation. Adams (U.S. Pat. No. 5,990,871) disclosed a similar device having a relatively large ball supported on a generally conical or mountain-like fixed base. The Adams ball provides as an ambidextrous hand support. A command button for actuation by a finger of the hand was included in the Adams device. Suzuki (U.S. Pat. No. 6,130,664) disclosed an input device designed to operate on a non-planar surface. A curved lower surface of the input device of Suzuki is configured to rest on any work surface and to roll along the surface. Velocity sensors are used in the Suzuki device to detect motion of the device relative to the surface.

In some cases, computer operators working in graphic design, engineering design, architectural design, and the like use so-called trackball devices as pointers for cursor control. Such devices are said to provide for selection of a point, such as a specific display pixel, without the selection action moving the device and thus the display cursor. Pressing a selector button without at least some movement may be found in some cases to be difficult with some mouse devices because the action of pressing the selector key often moves the mouse body and thus the cursor. However, cursor motions driven by a track ball device are said to be counterintuitive to many users relative to a combination of X-axis motion and Y-axis motion.

As mentioned above, the typical mouse-type device generally includes one or more control actuators, selectors, or buttons for sending application specific commands to the computer along with the position or movement data for the mouse. A typically used selector key may be pressed by the user's finger and caused to contact an electrical switch configured within the device. A typically-utilized electrical switch of high reliability and low cost has a very short actuation displacement of about one sixty-fourth of an inch (0.015 inch, 0.4 mm). Such devices are typically configured in a mouse where the switch is directly actuated by pressing a key cover positioned directly over the switch. Some users find this configuration unsuitable as to the working tactile sensation of actuation.

Currently available mouse-type devices are said to contribute to work-related health problems. For example, mouse usage is thought to be a factor in repetitive stress injuries among information technology workers. Complaints of office workers and other information technology users may include symptoms of repetitive motion disorders possibly related to extended periods of computer mouse usage. Using the human hand to move a mouse on a planar surface is thought to be inherently incompatible with the functional anatomy of the human hand and arm. Such movements may require sizable extensions and retractions of the arm and hand. Wired mouse devices also may sometimes present impediments to movement relative to the wire or cable connecting the mouse to the computer. In some situations, excessive tension may be produced in hand and arm muscles, especially when making precise mouse movements and command selections. Overuse and fatigue of hand and arm muscles may result. Moreover, the placement and configuration of control buttons, thumbwheels, trackballs and the like may be associated with unusual flexion and extension of the fingers which are thought to be tiring and uncomfortable.

There remains a need for a mouse-type device that is ergonomically friendly to the human hand and arm and capable of effective precise pointing and command generation.

SUMMARY OF THE INVENTION

The present invention entails a computer mouse having a hand actuated controller whose movement is dictated or controlled by a toroidal surface.

In one embodiment, the mouse includes a controller that rests on a base where the base has a concavity formed therein. The controller includes a lower toroidal surface that projects at least partially in the concavity of the base. A series of spaced apart ball bearings are interposed between the base and the toroidal surface such that as the controller is moved, the toroidal surface engages and moves over the ball bearings. As the surface moves, the controller detects the motion relative to the base.

Other objects and advantages of the present invention will become apparent and obvious from a study of the following description and the accompanying drawings which are merely illustrative of such invention.

DESCRIPTION OF THE INVENTION

Figure 1:
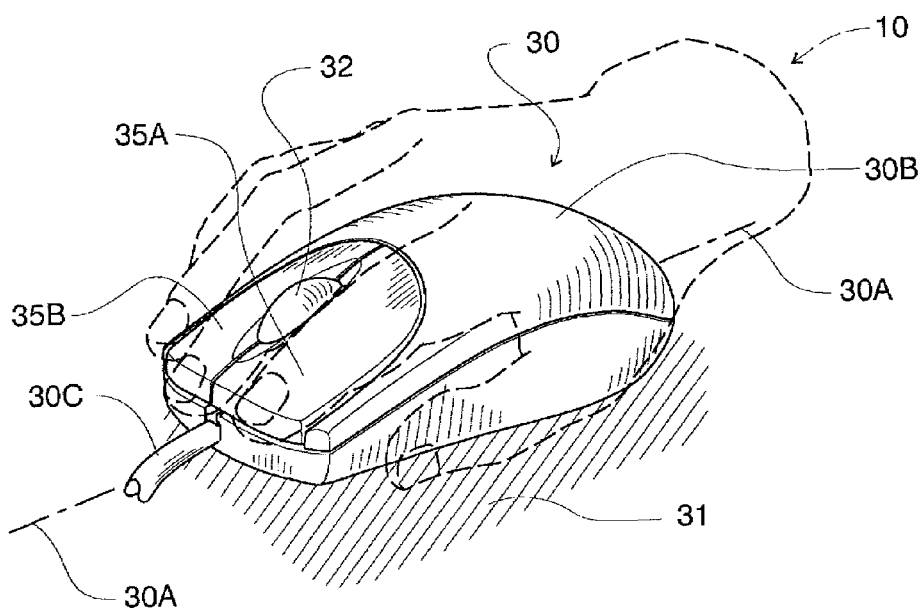
FIG. 1 is a perspective view of a prior art computer mouse device in use.
Figure 2:
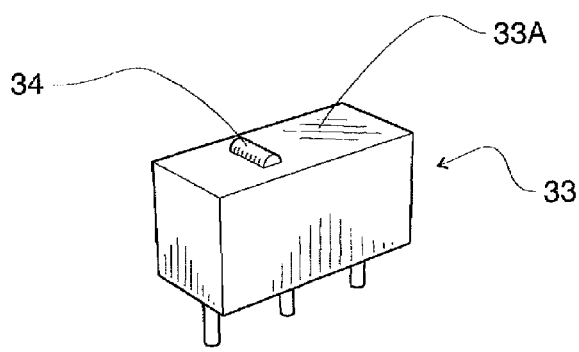
FIG. 2 is a perspective view of a commonly used electrical switch.

It is instructive to first consider the basic structure and use of a typical prior art computer mouse, indicated generally by the numeral 30 in FIG. 1. Mouse 30 comprises a hand-movable body having a longitudinal axis 30A and a hand-engaging surface 30B. The hand-movable body is typically supported on a generally planar work surface 31 such as that of a desk or table. Mouse 30 may be connected to a computer via cable 30C. Actuators or selectors 32, 35A, and 35B are included on Mouse 30. Actuators 35A and 35B typically comprise keys or buttons that are mechanically interfaced with a switch such as switch 33 shown in FIG. 2. Commonly, switch 33 is mounted interiorly of mouse 30 underneath actuator key 35A, for example, such that the required movement of the key is the same as that required of plunger 34 for switch actuation. Selector switch 33 is typically connected to circuitry (not shown) capable of sending a signal in response to actuation of the switch. Actuator 32 is typically a scroll wheel that is configured to be actuated by tangential contact with one of the fingers of the user. Scroll wheel 32 is commonly interfaced with hardware and circuitry (not shown) capable of encoding wheel rotation and sending a signal in response to motion of the scroll wheel.

Mouse 30 may be engaged by a hand 10 of a user as shown in FIG. 1. The user may move mouse 30 about on planar surface 31 to, for example, move a cursor or other icon on a computer display. The user may rotate scroll wheel 32 to, for example, scroll up or down in a menu, and may press either or both of keys 35A and 35B to send commands, for example, such as "select" or "open" to a computer application. Movement of mouse 30 about on planar work surface 31 typically requires the user to translate hand 10 in a plane generally parallel to the work surface. Such hand movement may require repeated arm extension and flexion as well as wrist extension and flexion. Actuation of selectors 32, 35A, and 35B may also require repeated flexion and extension of one or more fingers of the hand.

Figure 3:
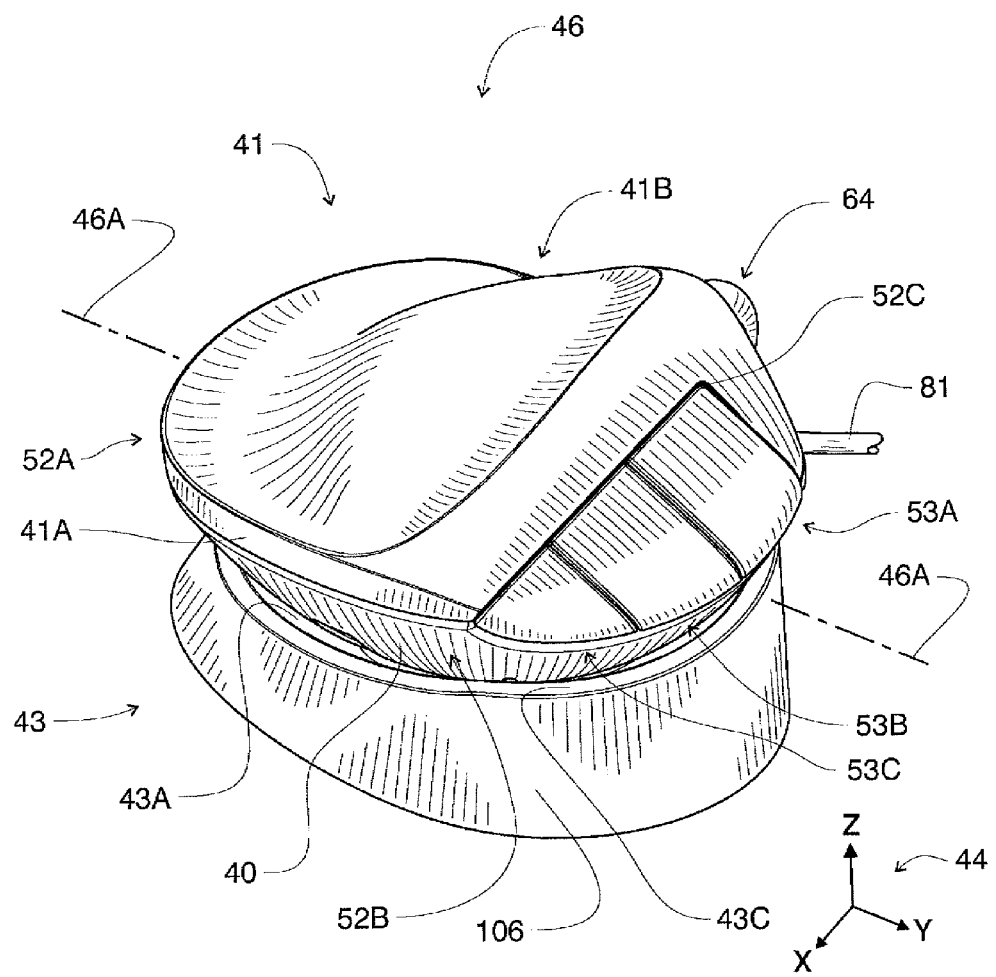
FIG. 3 is a perspective view of the mouse of the instant invention.
Figure 7:
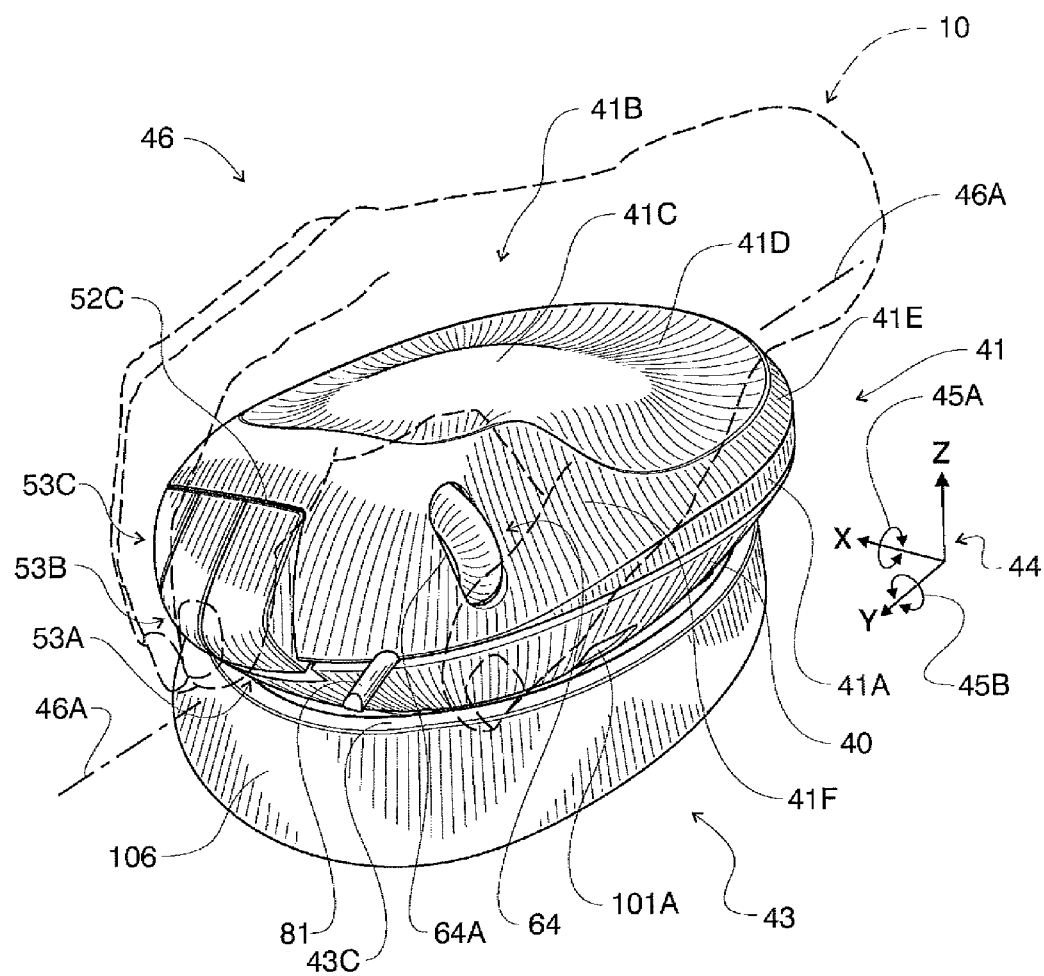
FIG. 7 is a front-side perspective view of the mouse.
Figure 8:
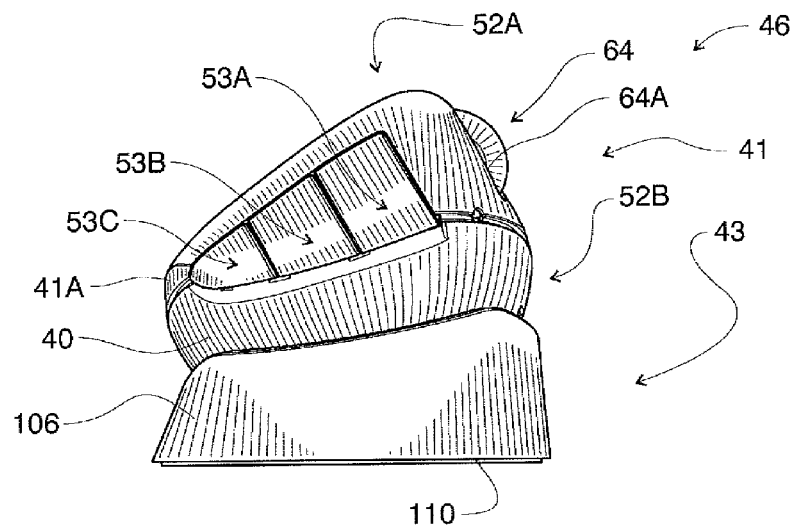
FIG. 8 is a front elevation view of the mouse.
Figure 9:
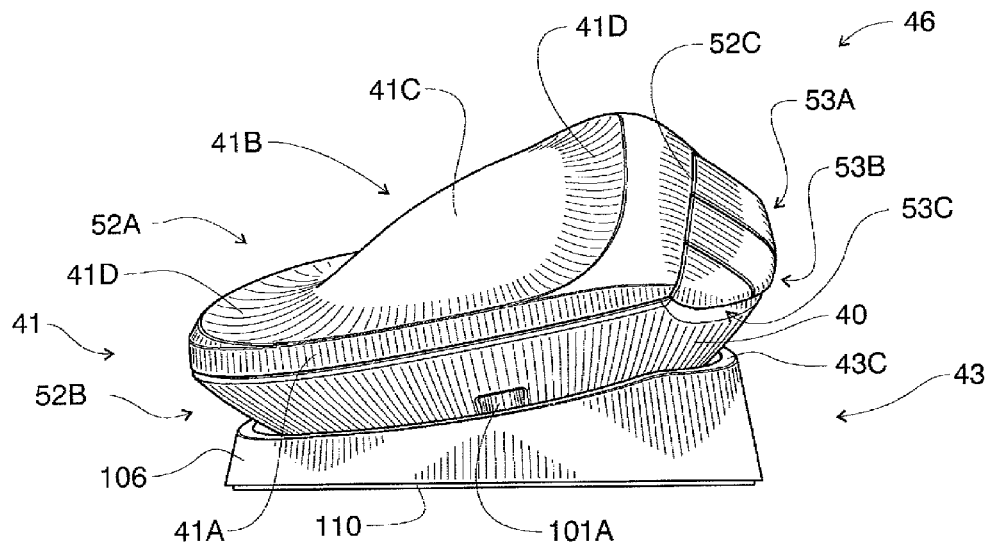
FIG. 9 is a right side elevation view of the mouse.
Figure 10:
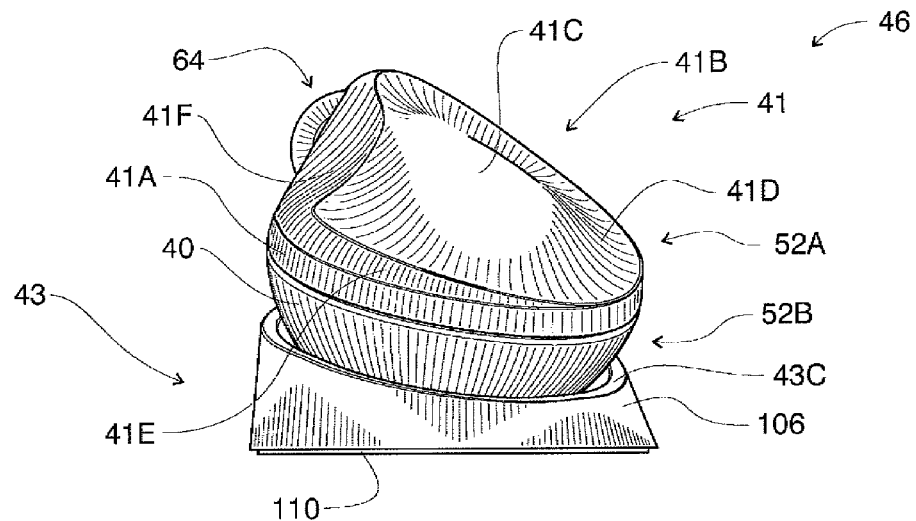
FIG. 10 is a back elevation view of the mouse.
Figure 11:
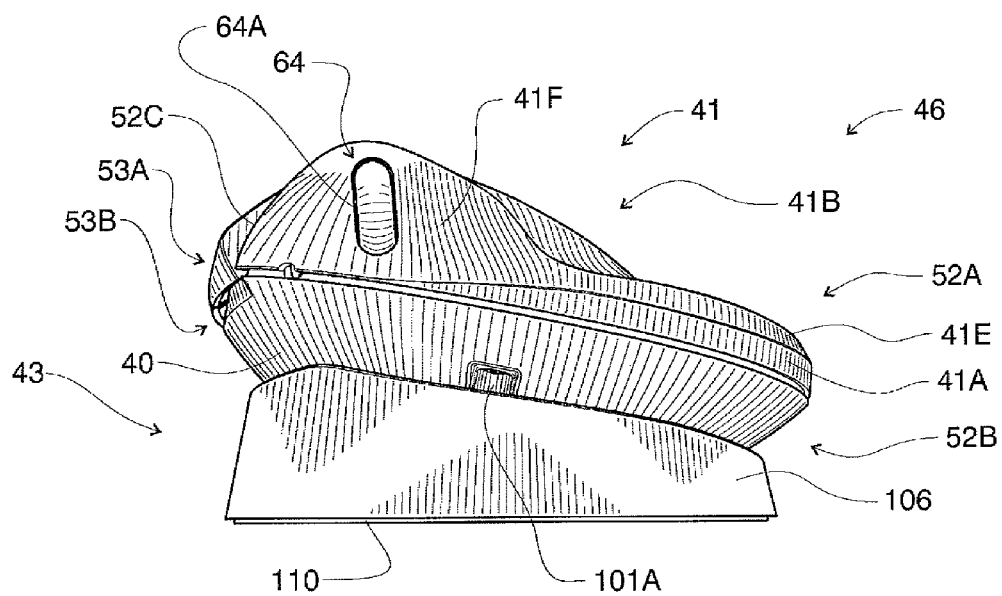
FIG. 11 is a left side elevation view of the mouse.

The present invention is a mouse, indicated generally in the drawings by the numeral 46. For purposes of description herein, mouse 46 is shown in FIGS. 3 and 7 juxtaposed a reference Cartesian coordinate system 44 having a mutually orthogonal X, Y, and Z axes. For purposes of description only, the Z-axis of system 44 is considered to be vertical. The arrows in system 44 define the positive directions of the respective axes. All references herein to X, Y, and Z axes or directions are with reference to coordinate system 44. References herein to the tops of features of mouse 46 always refer to aspects of the features that face generally in the positive direction of the Z-axis. References herein to the fronts and backs of any features of mouse 46 refer to aspects of the features that face generally in the positive and negative directions, respectively, of the Y-axis. References to the right and left of any features of mouse 46 refer to aspects of the features that face generally in the positive and negative directions, respectively, of the X-axis.

Mouse 46 includes a first subassembly or base 43 and a second subassembly or controller 41. Base 43 and controller 41 share a common longitudinal axis 46A when the base and the controller are operably engaged. Axis 46A is parallel to the Y-axis. When operably engaged, controller 41 is supported on base 43. In one embodiment, controller 41 is configured to be received in and supported by base 43 such that the controller is relatively free in the operative mode to be moved only rotationally relative to the base. Base 43 may rest on a generally planar work or support surface parallel to the X and Y axes of coordinate system 44. The invention does not, however, restrict the support surface to being planar, nor does the invention restrict the Z-axis of coordinate system 44 to being vertical.

Controller 41 comprises a top shell 52A and a bottom shell 52B. Top shell 52A and bottom shell 52B are generally bowl-shaped shells that are secured together with respective generally concave aspects facing each other to form the body of controller 41. Top shell 52A includes a generally upward facing hand receiver or hand-engaging surface 41B generally surrounded by a peripheral wall 41A. The lower edge of wall 41A generally defines the assembly plane of controller 41. Openings or cutouts 52C and 64A are formed or cut in top shell 52A for receiving portions of selectors 53A, 53B, 53C and thumbwheel 64.

Figure 16:
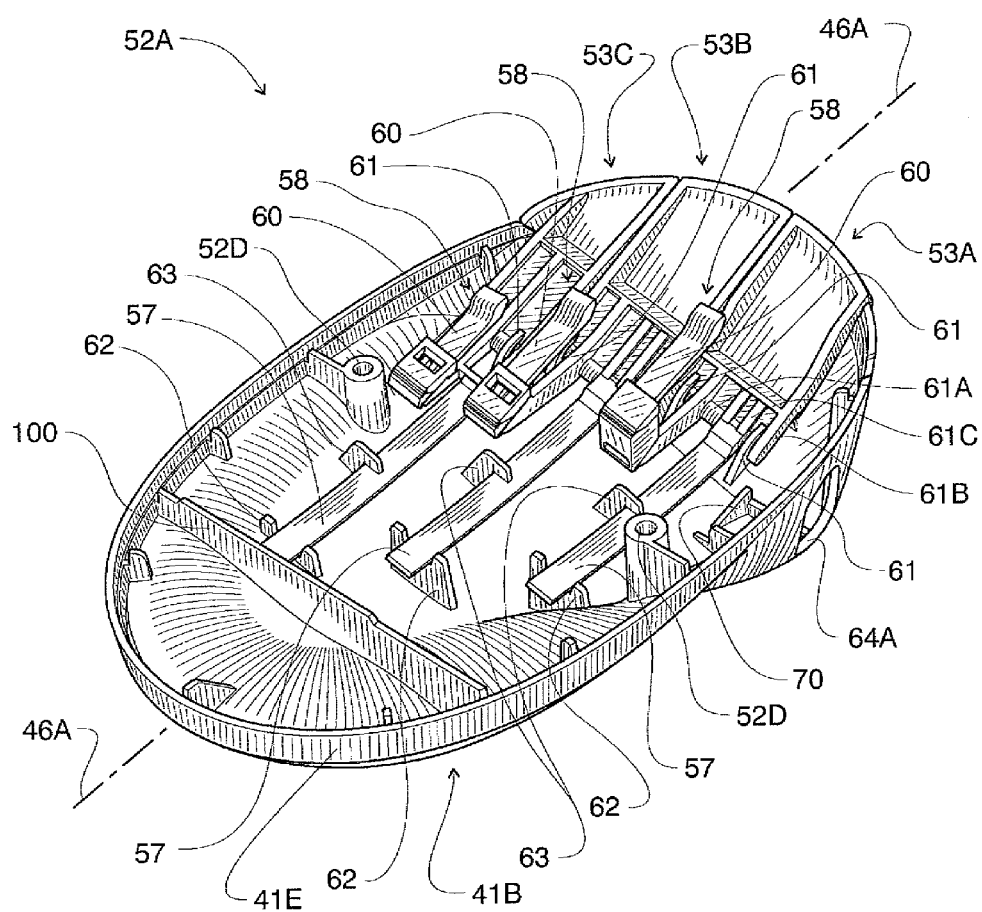
FIG. 16 is a perspective view from the underside of the top shell of the controller.

In one embodiment, the underside of top shell 52A has formed thereon various supporting structures as shown in FIG. 16. There are provided three return spring supports 62. Blocks 62 are each spaced backwardly from cutout area 52C of top shell 52A. A return spring hook or retainer 63 is provided between cutout 52C and each block 62. Formed adjacent cutout 52C are three pairs of spaced apart hook-shaped selector pivot blocks 61. A thumbwheel circuit mounting strut 70 is formed adjacent cutout 64A. A rib 100 is formed across top shell 52A, spaced backwardly from return spring support blocks 62. Bosses 52D are formed adjacent sides of top shell 52A.

Bottom shell 52B includes a base-engaging surface 40. Surface 40, in one embodiment, is convexly-shaped and curves upwardly to meet a lower edge of peripheral wall 41A when connected to top shell 52A. Formed in bottom shell 52B and extending generally upward from surface 40 are a pair of recesses 101A that include fastener openings for receiving fasteners or screws 101. In one embodiment, base engaging surface 40 also includes an opening 47 that provides a motion sensing system port, which system will be discussed below. Shells 52A and 52B may be formed of polymeric material by various fabrication methods including casting and injection molding.

Top shell 52A and the bottom shell 52B are, in one embodiment, secured together by screws 101 extending in recesses 101A through the fastener openings and into mounting bosses 52D that are molded on the underside of the top shell (see FIG. 16). Shells 52A and 52B enclose an interior space and surfaces for mounting other components of mouse 46 as described below. An electrical cable 81 may be provided for electronic connection of mouse 46 to a computer.

Figure 6:
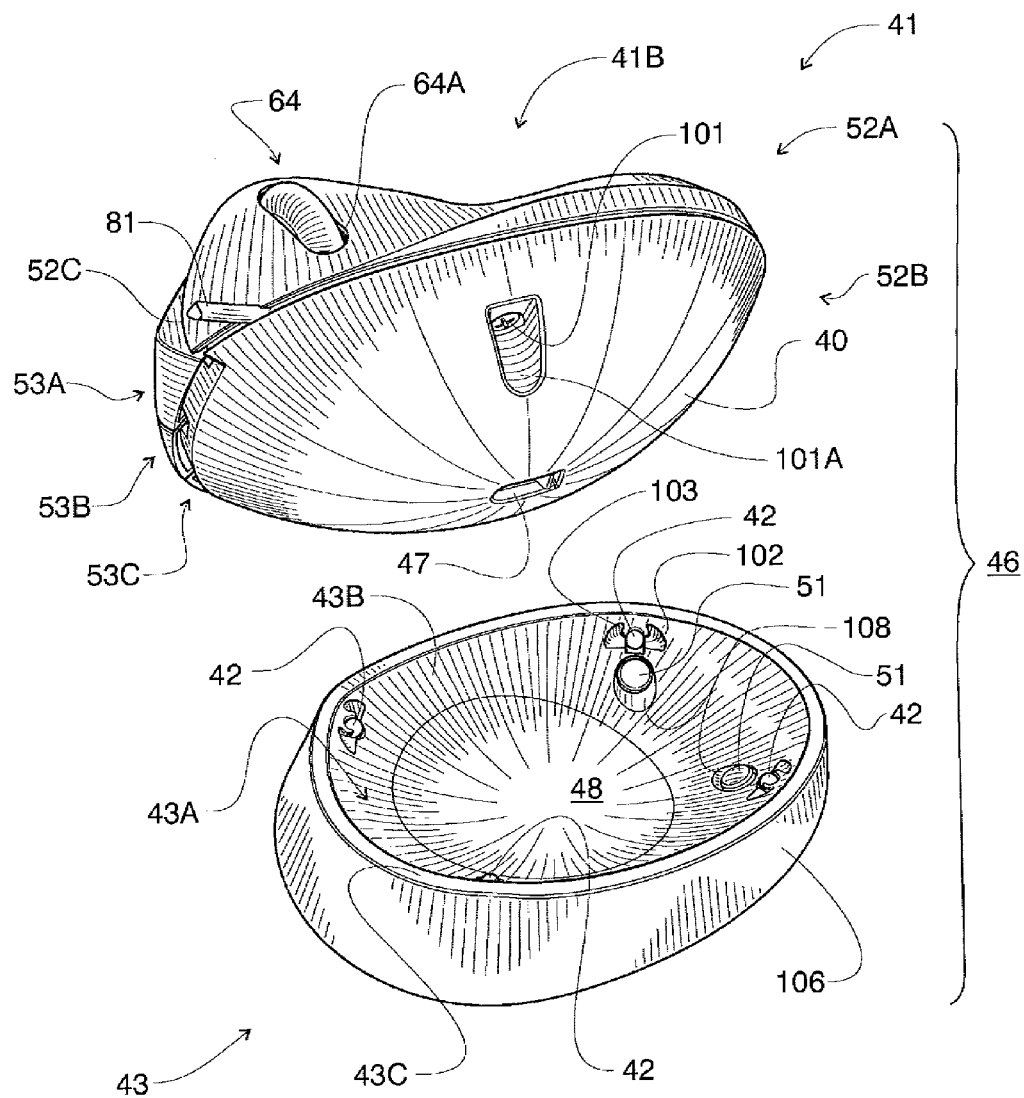
FIG. 6 is a perspective view of the mouse with the controller lifted from the base.

Turning now to base 43, the base includes a base shell 106, or wall, generally defining a periphery of the base as shown in FIG. 6. Base 43 may be of a generally oval or elliptical shape as illustrated, although other shapes may be utilized. In one embodiment, a concavity 43A is formed in base 43. Concavity 43A includes a generally central depressed area 48 and an upwardly curved annular inner skirt portion 43B extending upward and outward from area 48 to form a bowl-like shape. Inner skirt 43B is peripherally bounded by a base rim 43C forming generally annular surface that encircles concavity 43A and forms a topmost surface of base 43. In one embodiment, base 43 includes a controller support system comprising spaced-apart bearings 42 and motion damping pads 51, both of which are discussed below.

Base 43 may include a snap-in bottom plate 109 that provides load distribution and a resilient foot 110 that prevents the base from moving relative to the support surface. Bottom plate 109 may provide a place for labeling by molding, printing, or applying an adhesive label. Base 43 may be formed of polymeric material by various fabrication methods including casting and injection molding.

Figure 5:
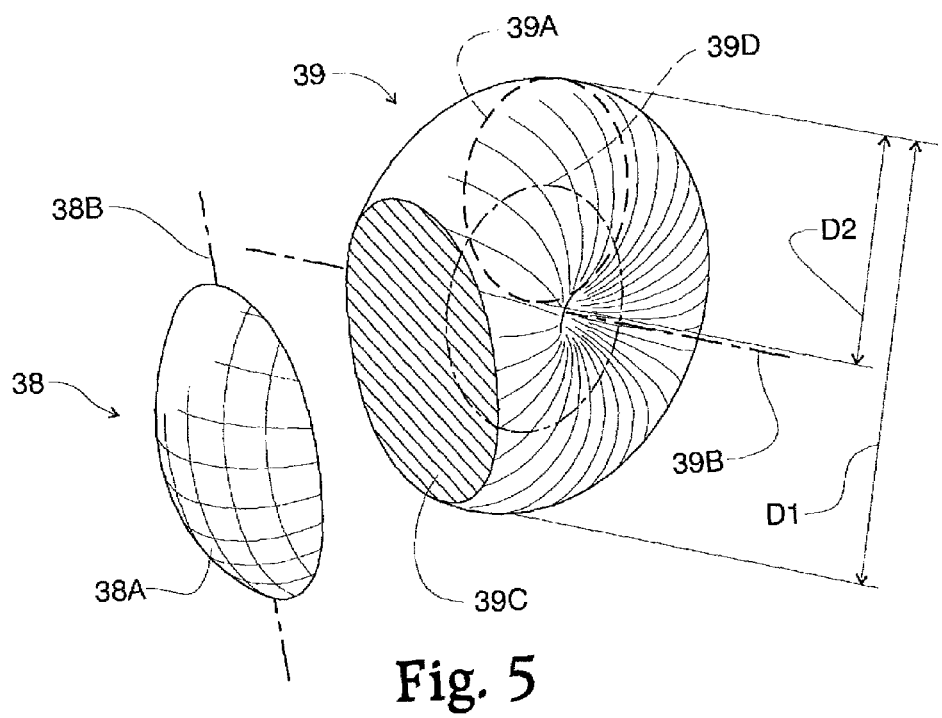
FIG. 5 is a perspective view of a ring torus with a cut portion.

Turning now in more detail to controller 41 and base-engaging surface 40, in one embodiment the base-engaging surface is a toroidally shaped guide surface. The toroidal shape of base-engaging surface 40 may be defined by an outer surface 38A of a ring torus 39 as shown in FIG. 5. Ring torus 39 is a geometric solid that is formed by rotating a generating circle 39A about an axis 39B that is co-planar with the circle. Diameter $D_1$ is greater that diameter $D_2$ of ring torus 39. The center of the generating circle describes a circular path 39D. Circular path 39D is actually the locus of tangency points of the central axis of generating circle 39A and can be referred to as circular axis 39D. A segment 38 of ring torus 39 is formed by passing a cutting plane 39C that is parallel to and offset from axis 39B through the torus. Segment 38 is shown offset from the remainder of ring torus 39 in FIG. 5. Outer surface 38A of segment 38 has a longitudinal axis 38B. It is appreciated that surface 38A is circularly curved about two mutually normal axes: axis 39B and circular path or axis 39D. Moreover, the radius of curvature, $D_2/2$, about circular axis 39D is smaller than the radius of curvature, $D_1/2$, about axis 39B.

When the shape of surface 38A is implemented to form toroidal base-engaging or guide surface 40, axis 38B is parallel to the plane defined by the Y axis and the Z axis and torus-generating axis 39B is parallel to the plane defined by the X axis and the Z axis. When controller 41 is operably engaged with base 43, toroidal base-engaging surface 40 is generally contained in concavity 43A of the base and engaged with the support system.

Figure 21:
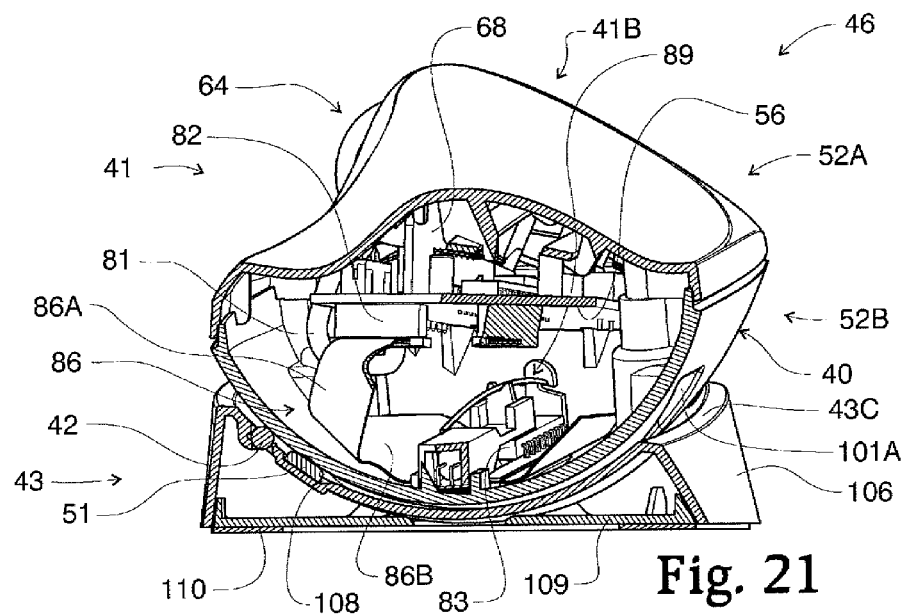
FIG. 21 is a sectional view of the mouse at cutting plane 21 of FIG. 12.
Figure 22:
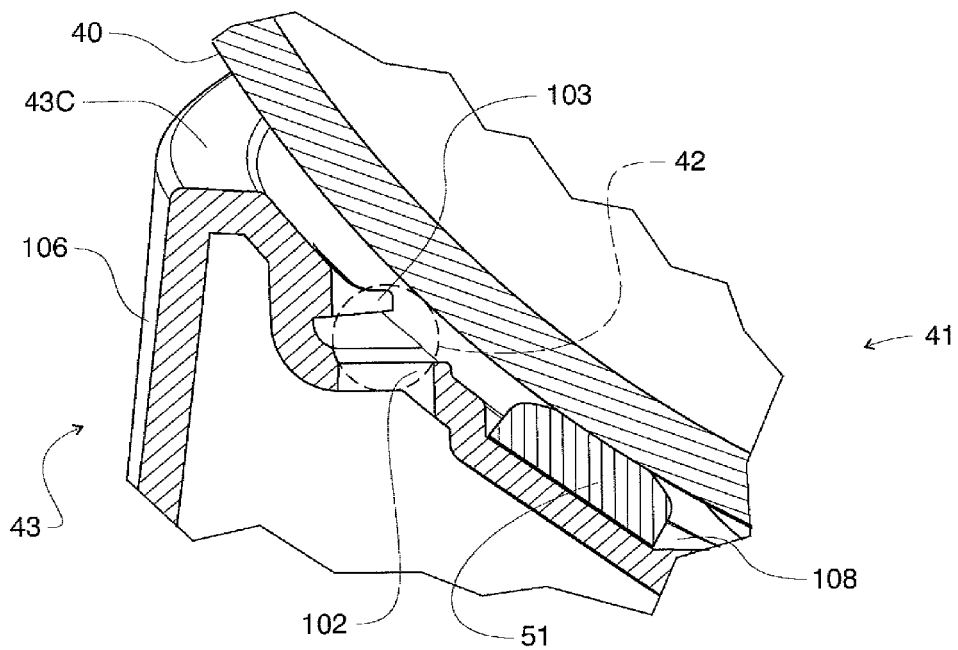
FIG. 22 is a fragmentary side section view of a ball bearing socket.

To support controller 41 on base 43, in one embodiment the support system is deployed in the base and contacts toroidal base-engaging surface 40 of the controller. In one embodiment, the support system includes a series of four spaced-apart ball bearings 42 mounted in concavity 43A, as mentioned above. Sockets 102 and retainers 103 for holding ball bearings 42 are formed in concavity 43A in one embodiment. See FIGS. 21 and 22. One pair of bearings 42 deployed near a front end portion of base 43 and another pair disposed at an opposite, or rear, end portion as shown in FIG. 6. Bearings 42 project from base 43 such that their centers lie on a toroidal surface that generally matches the toroidal shape of base-engaging surface 40. Retainers 103 are configured to permit snapping bearings 42 into the sockets 102 by temporarily deflecting the retainers. Bearings 42 project into concavity 43B a distance sufficient to provide adequate clearance between controller 41 and base 43 when the controller is supported on the bearings and rotated about on the bearings.

Sockets 102 and retainers 103 may, in one embodiment, be directly molded as a feature of the base 43 via a double shut-off retracting ejector in the mold tool (not shown) for each location.

Figure 23:
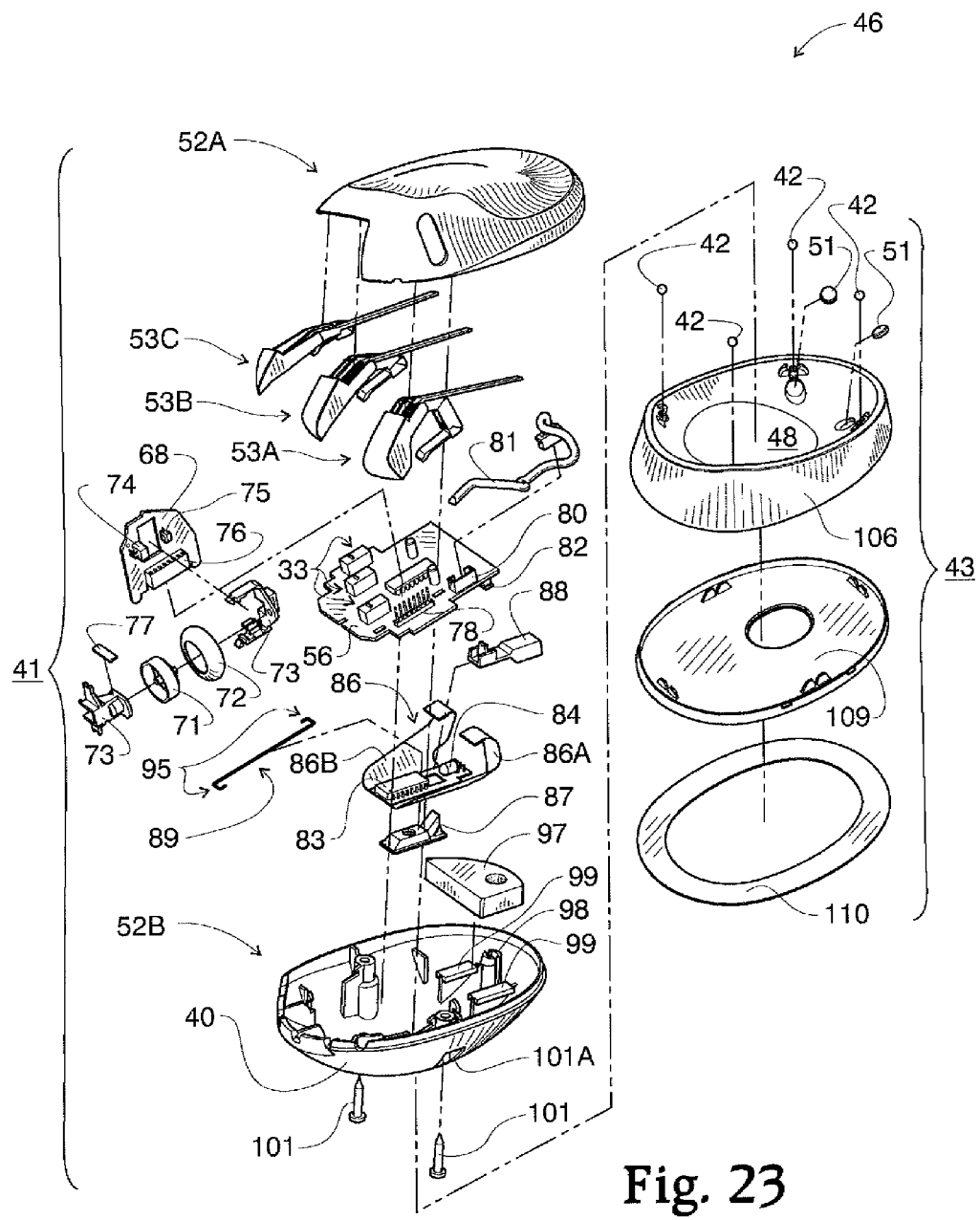
FIG. 23 is an exploded perspective view of the mouse.

To, in part, further support and dampen movement of controller 41, damping pads 51 are utilized in one embodiment. Each pad 51 may be a relatively compliant friction pad seated in a recess or damping pad socket 108 formed in concavity 43A. See FIGS. 6 and 23. In one embodiment, pads 51 are adhesively bonded in recesses 108. Pads 51 provide friction damping of motion of controller 41. In one embodiment, two pads 51 are utilized, one adjacent each bearing 42 in the rear end portion concavity 43B.

Supported as described above, controller 41 may only be rotated relative to base 43. Controller 41 cannot translate relative to base 43. Moreover, controller 41 can only be rotated about the X and Y axes; the controller cannot rotate about the Z axis. In use, controller 41, may be rotated by hand 10 engaged generally with mouse 46 as shown in FIG. 7. The movements of hand 10 to control the position of controller 41 in base 43 may comprise only circular arcs of motion about the X and Y axes or combinations of the two circular arcs. Because of the toroidal shape of base-engaging surface 40, the radius of any circular arc of motion about the X axis is different from the radius of any circular arc of motion about the Y axis. In one embodiment, the radius of any circular arc of motion about the X-axis is larger than the radius of any circular arc of motion about the Y-axis.

Figures 4A, 4B:
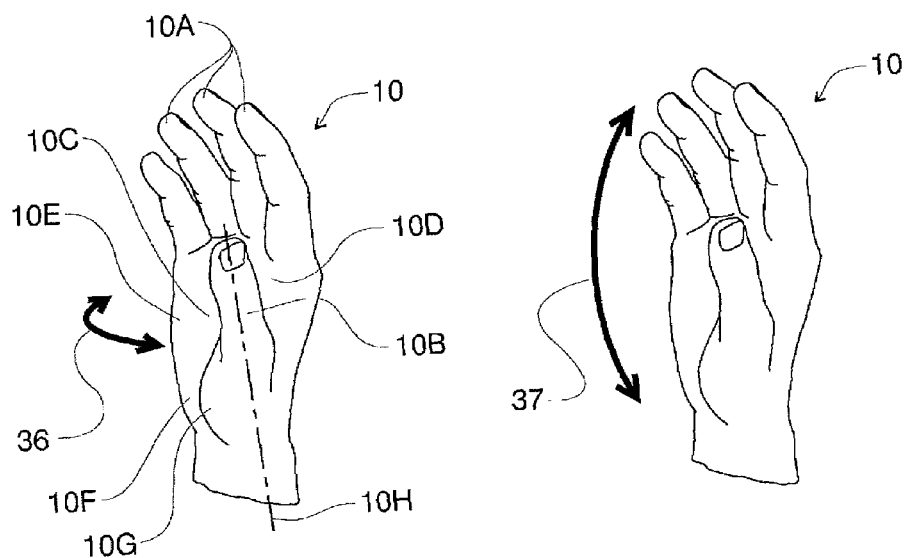
FIG. 4A is a perspective view of a human hand illustrating a "Queen wave."
FIG. 4B is a perspective view of a human hand illustrating a "Toddler wave."

The motions of hand 10 required to control the position of controller 41 relative to base 43 may also be described as so-called queen wave 36 and toddler wave 37 motions. See FIGS. 4A and 4B. Mouse 46 is thus configured to permit pointer position control on a computer, for example, by motions of hand 10 limited to rotational or circular motions consistent with natural hand rotations. This configuration also blocks hand motions that may cause traditional mouse related injuries.

Figure 12:
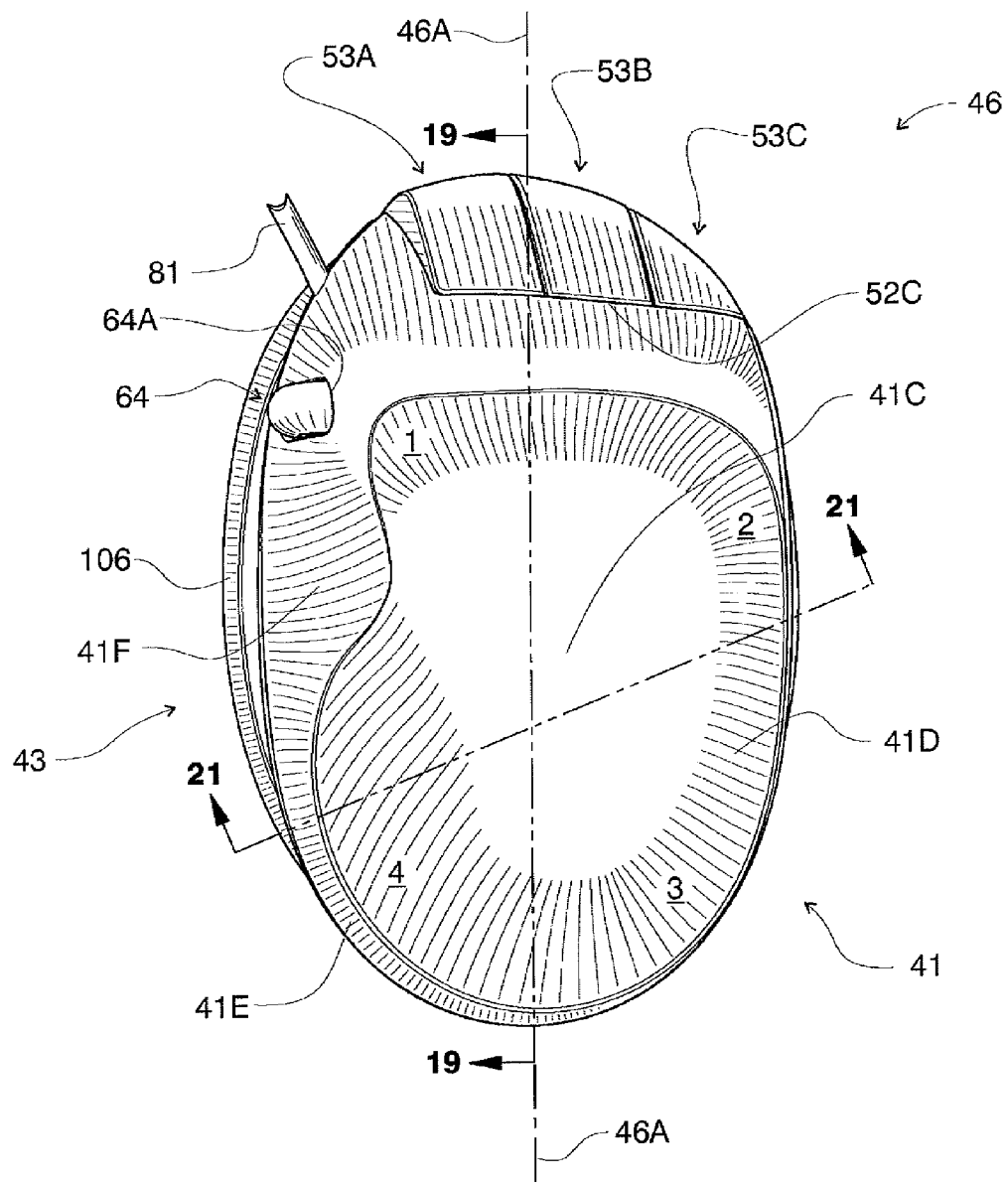
FIG. 12 is a plan view of the mouse.

Turning now to the details of provisions for engaging hand 10 with mouse 46, hand-receiver or hand-engaging surface 41B, includes a raised contoured palm seat 41C and a depressed contoured hand seat 41D. Raised palm seat 41C comprises a mound or upwardly projecting protuberance shaped to receive palm 10C of hand 10. Hand seat 41D, viewed from above, exhibits a generally spiral shape depression that partially wraps around palm seat 41C as shown in FIG. 12. The depression of spirally disposed hand seat 41D is shaped to conform generally to the palmar aspects of hand 10 that surround palm 10C. More particularly, depression 41D follows a generally spiral path starting at about point 1, corresponding approximately to index finger base knuckle pad at area 10D of hand 10. See also FIGS. 4A and 4B. The path continues clockwise across top shell 52A to about a point 2, corresponding approximately to side palm 10E. Thence, the path continues to point 3 approximately corresponding to heel 10F, from whence the path curves around to about point 4, corresponding approximately to thumb base 10G and completing spiral around palm seat 41C. The depression of hand seat 41D is contoured generally upward and towards palm seat 41C to provide a smooth transition between the hand and palm seats.

Hand seat 41D is surrounded by a generally sloping skirt portion 41E. Front portion 41F includes cutout 52C where selector keys 53A, 53B, and 53C project. Skirt 41E extends rightward where the skirt narrows and extends rearward around the right side of hand seat 41D. Skirt 41E widens as it extends around the rear of seat 41D and merges with portion 41F. Portion 41F corresponds generally to thumb 10B of hand 10. Included in thumb portion 41F is cutout 64A where thumbwheel 64 projects. In one embodiment, portion 41F of skirt 41E is sloped in a horizontal plane at an acute angle relative to the longitudinal axis 46A. The angle approximates the angle of longitudinal axis 10H of thumb 10B relative to palm 10C in relaxed human hand 10, or approximately 20-35°. The actual dimensions of hand seat 41D and skirt 41F may be varied to accommodate implementations of mouse 46 for users with widely varying hand sizes. Standard anthropometric data may be employed along with plaster models of average-sized hands to produce the contoured shapes described above of hand-engaging surface 41B. Hand-receiver 41B can be formed of a polymeric material through any of various plastic part forming methods including casting and injection molding.

Mouse 46 includes a circuit board assembly that comprises a primary circuit board 56 secured to a thumbwheel circuit board 68. Pertinent aspects of circuit boards 56 and 68 are described below relative to supported elements. Generally, however, circuit board 56 is mounted inside bottom shell 52B. Thumbwheel circuit board 68 is mounted perpendicularly to primary circuit board 56, tabs 68A being inserted into slots 69. Thumbwheel circuit board 68 is inserted into support strut 70.

Turning now to the motion sensing system for detecting the rotational position of controller 41 relative to base 43, in one embodiment an optical motion sensing system is utilized. The motion sensing system includes an optical illuminator 84 mounted in the interior of controller 41 to illuminate a portion of base 43 by directing a light beam though opening or port 47 in base shell 52B. See FIG. 19. The system further includes an optical detector 83 to detect movement relative to the illuminated portion of base 43. Central depressed area 48 forms, in this embodiment, a target area that is sufficiently large to include any area that can be possibly illuminated as controller 41 is rotated in base 43. Central depressed area or target area 48 is printed or textured with features to optimize motion detection. Such printing and texturing is well known in the art.

Optical detector 83 (see FIG. 19) and associated illuminator or LED 84 are mounted on a stiffened portion 85 of a flexible printed circuit 86. An LED cage 88 is provided and includes a support post 88A with an upwardly projecting notch or yoke. A lens and prism component 87 is also provided. In assembly, LED cage 88 and lens and prism component 87 sandwich stiffened portion 85 and interlock to secure the LED cage 88 and lens/prism component 87 to the stiffened portion of flexible printed circuit 86. Flexible printed circuit 86 mates with FPC connectors 82 on primary circuit board 56 and is suspended between the primary circuit board and the upper side of bottom shell 52B. Flexible printed circuit 86 includes a pair of upwardly-extending leg portions 86A and a curved scoop-like shape 86B holding stiffened portion 85. See also FIG. 23. Flexible printed circuit 86 is suspended from the primary circuit board 56 by leg portions 86A.

Figure 19:
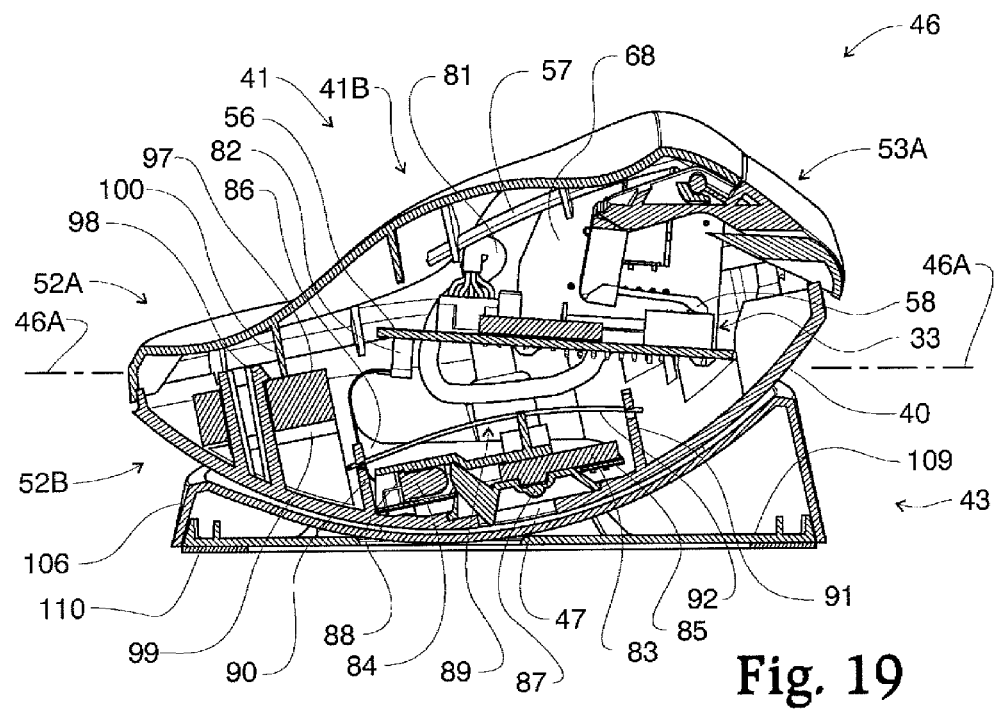
FIG. 19 is a side sectional view of the mouse at cutting plane 19 of FIG. 12.
Figure 20:
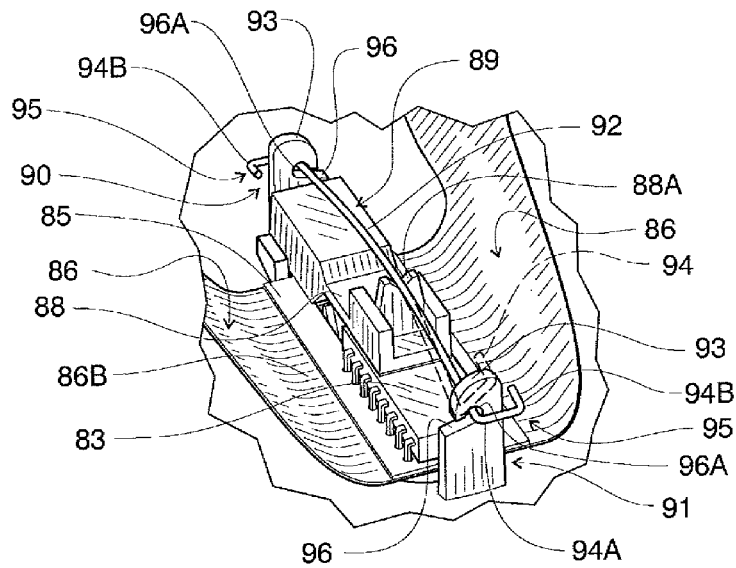
FIG. 20 is a fragmentary perspective view of the optical motion sensing assembly.

For attaching flexible printed circuit 86 to bottom shell 52B, a back hook tab 90 and a front hook tab 91 are formed in the upper or interior side of bottom shell 52B as shown in FIG. 19. Each of hook tabs 90 and 91 includes a hook portion 93 with an open side. The open side of hook portion 93 on back hook tab 90 faces in the opposite direction from that of the open side of the hook portion on front hook tab 91. The top of hook portion 93 is configured to act as a cam to aid assembly. An upwardly-sloping surface 96 terminates in a curved upper portion 96A in each hook portion 93. A wire retainer 89 is provided to attach flexible printed circuit board 86 to hook tabs 90 and 91.

Wire retainer 89 is, in one embodiment, a length of spring steel wire including a center section 92 with bend-backs 95 at opposite ends of the center section. Each bend-back 95 includes two ninety degree bends, 94A and 94B. Bend-backs 95 lie in a common plane and extend opposite in directions from each other. In assembly, retainer 89 is slightly bent and twisted by engaging one bend-back 95 into back hook tab 90 and resting center section 92 in the yoke of support post 88A. The end portion of center section 92 thereby made adjacent to front hook tab 91 may then be slid laterally over the cam portion of the top of the hook tab until it snaps into curved upper portion 96A. As the retainer 89 is pushed into place, the bend-back end portion 95 at hook tab 90 impinges on the closed side of hook tab 90 and results in a torque on center section 92. The end portion of center section 92 adjacent hook tab 91 can then be guided along camming surface of 93 until the end portion seats into curved end portion 96A of the hook tab. When the end portion of center section 92 seats against curved upper portion 96A, bend-back 94 at the end of the wire has clearance to allow the torsion to relax and snap retainer 89 into a secure hold-down position where the center section remains bent over post 88A.

The motion sensing system of the embodiment described above enables generation and transmission of signals from mouse 46 to a computer. These signals describe the instantaneous position of controller 41 in base 43 as the controller is rotated about the X and Y axes while being supported by the base. The computer interprets these signals to position a cursor, for example, on a computer display.

Turning now to the actuators or selectors deployed in mouse 46, the actuators include, in one embodiment, the above mentioned three selector or actuator buttons 53A, 53B, and 53C along with a thumbwheel 64. A user may engage controller 41 with hand 10 as, shown in FIG. 7, in a manner such that fingers of the hand may contact buttons 53A, 53B, and 53C and the thumb of the hand may contact thumbwheel 64. As discussed above, selector buttons 53A, 53B, and 53C and thumbwheel 64 extend in cutouts 52C and 64A, respectively, and are electrically connected to conventional circuitry (not shown) on primary circuit board 56 and thumbwheel circuit board 68. This circuitry translates, by well known methods, the actuating motions of one or more of the fingers 10A and of the thumb 10B of hand 10 into signals and transmits the signals to, for example, a computer.

In one embodiment, selectors 53A, 53B, and 53C are of generally the same design, and each selector is configured to actuate a separate selector switch 33. Accordingly, the structure of selector 53A and assembly with switch 33 will be described with reference to FIGS. 13, 14, and 15.

Selector switch 33 is mounted on primary printed circuit board 56 whereby the switch is supported and also electrically connected to circuitry of well known design for transmitting a signal from mouse 46. Primary circuit board 56 is configured to be mounted within controller 41 as shown in FIG. 19. Selector 53A includes a generally arcuate shaped formed by a main strut having a key 54A with contact surface 54B, a link support portion 54C, a transfer link 54D, and a cam link 60. Disposed on key 54A is a finger contact surface 54B extending over front and upper surfaces of the key. An elongated return spring 57 forms a portion of key 54A that extends rearwardly and downwardly in a cantilever fashion. Return spring 57 is configured to partially enable mounting selector 53A on an underside of top shell 52A of controller 41 and to provide a restoring force to return the selector to an unactuated orientation.

Link support portion 54C of main body 54A extends rearwardly and downwardly adjacent return spring 57. As can be appreciated from FIGS. 14 and 15, return spring 57 and link support portion 54C are laterally offset from each other. Disposed near the origination of return spring 57 is a journal 61A with journal struts 61B and 61C extending normally thereto. Journal 61A defines a selector rotation axis 55. Struts 61B and 61C cooperate with return spring 57 to provide for securing selector 53A operably within controller 41 as will be discussed further here below.

Figure 13:
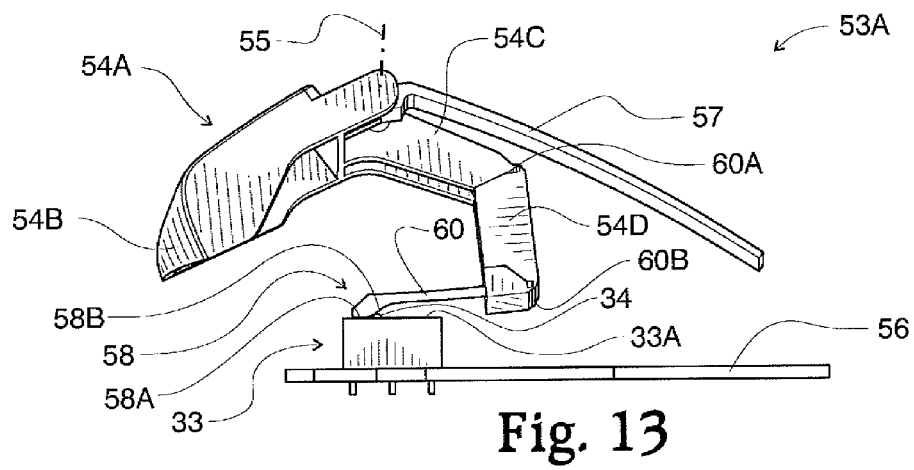
FIG. 13 is a side elevation view of a selector key in the installed position.
Figure 15:
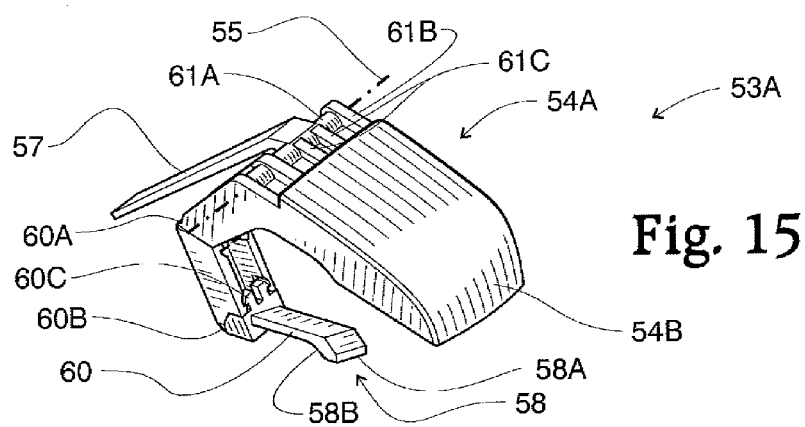
FIG. 15 is a perspective view of a selector key in the folded-for-installation position.

Transfer link 54D is pivotably connected to link support portion 54C by a first hinge 60A. The facing ends of transfer link 54D and link support portion 54C are beveled so that, when in an assembled or folded position as shown in FIGS. 13 and 15 the facing ends meet and an arcuate shape is assumed by the combined main body 54A and transfer link 54D. Cam link 60 is connected to transfer link 54D by a second hinge 60B, and facing ends of cam link 60 and transfer link 54D are shaped in a complementary fashion so that, when in an assembled or folded position as shown in FIGS. 13 and 16 the facing ends meet and the cam link 60 extends generally normal to the transfer link 54D. Cam link 60 is formed as a spring arm that can be pre-loaded during assembly.

An enlarged end portion of cam link 60 forms a cam 58 that is disposed adjacent switch follower button or plunger 34 when selector 53A is assembled with switch 33 as shown in FIG. 13. Cam 58 includes a lower surface 58A to rest adjacent plunger 34 on an upper surface 33A of switch 33. Cam 58 also includes a camming surface 58B disposed generally on the underside of the cam. When selector 53A is assembled with switch 33, cam surface 58B is close to but does not depress plunger 34. In one embodiment, camming surface 58B may include a concave conical surface for keeping cam 58 generally centered on plunger 34.

Figure 14:
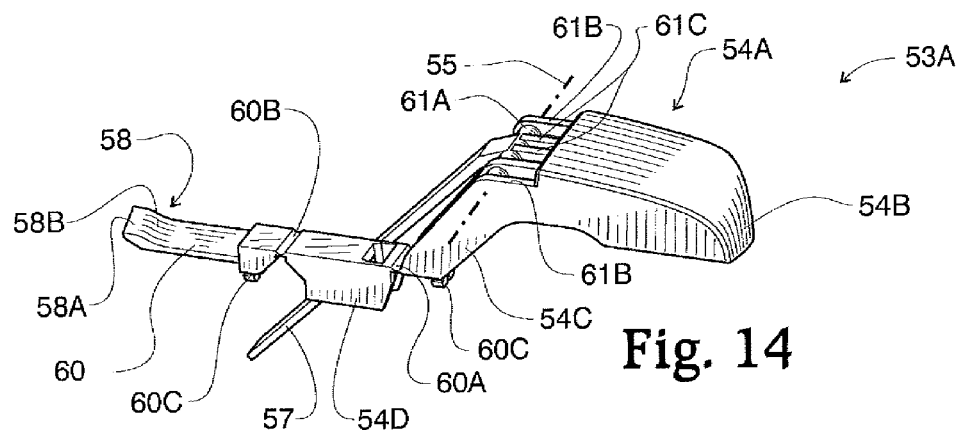
FIG. 14 is a perspective view of a selector key in the as-molded position.

While selectors 53A, 53B, and 53C may be of generally the same design, it is appreciated that actual dimensions may vary. For example the size of finger contact area or surface 54B may be different among the selectors. Likewise, the lengths of link support portion 54C, return spring 57, transfer link 54D, and cam link 60 may be of various sizes to accommodate varying actuation forces and distances. Selectors 53A, 53B, and 53C may be formed of a polymer material by any of various plastic part forming methods including injection molding. The polymer and the forming method should be chosen to provide a durable spring-like quality to the structure. Selectors 53A, 53B, and 53C can be molded in flattened configurations, as illustrated in FIG. 14, and then folded and snap locked into shape as shown in FIG. 15. Snap locking is provided for by well known latch structures 60C formed adjacent the first and second hinges 60A and 60B.

Turning now to the installation of a typical selector 53A in top shell 52A, the selector may be installed by guiding return spring 57 under retainer 63 and resting an end portion of the return spring on block 62. Journal 61A may be slid into engagement under portions of pivot blocks 61 such that selector 53A extends in cutout 52C and is snapped into place. Resulting pre-load on return spring 57 preload provides tactile feedback without backlash. So mounted, selector key 53A has an actuation arc generally about axis 55.

Selector circuit board 56 is mounted to the upper side, or inside of bottom shell 52B as discussed above. Placement of circuit board 56 is such that cam 58 rests against top surface 33A of switch 33 and camming surface 58B is immediately adjacent plunger 34 as mentioned above. Placement of circuit board 56 further provides that plunger 34 be generally aligned with a normal to circuit board 56 that passes through journal 61A. Further, the placement of circuit board 56 provides the pre-load mentioned above of cam link 60 due to deflection of the link as cam 58 is engaged with selector switch 33.

The selector key installation described above enables actuation of switch 33 with sufficient travel of finger surface 54B to provide a tactile motion that is thought to improve user sensation of actuation. Actuation of electrical selector switch 33 is achieved by pulling a finger that is in contact with finger contact area 54B toward the palm of the hand similarly to pulling a trigger. Because the force for actuation is resolved against the palm of the hand on the controller 41, there is no residual load to disturb the cursor position. With proper hand engagement, pivot axis 55 is located as close as possible to the finger joint being used for actuation. Selector 53A rotates in unison with the respective middle and distal phalanges of the finger when the key pulled. The other keys 53B and 53C function similarly.

This configuration can provide reliably functional keys 53A, 53B, and 53C over the range of accumulated manufacturing tolerance variations. This configuration also provides for protecting the electrical switch 33 from the excessive pressure that may be caused by an excited user as cam link 60 can only deliver a limited force to electrical switch 33.

Figure 17:
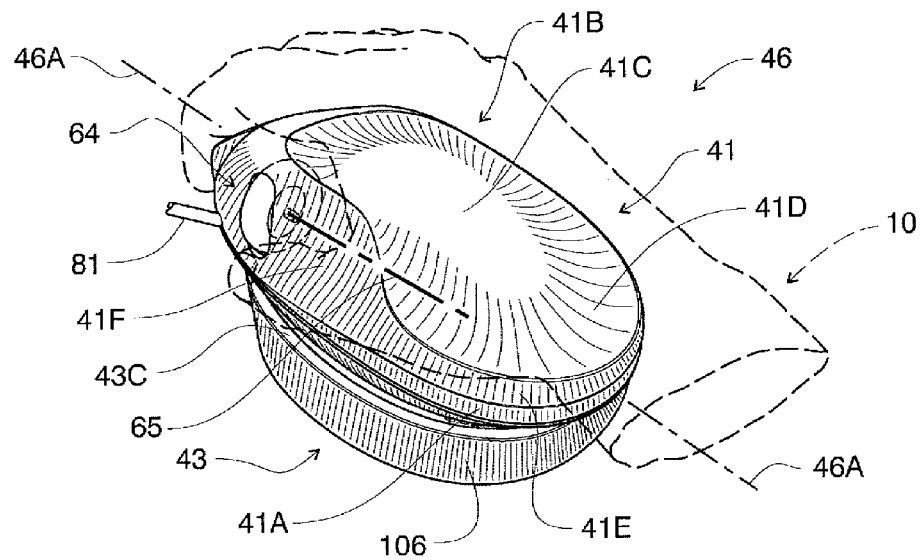
FIG. 17 is a perspective view of the mouse.
Figure 18:
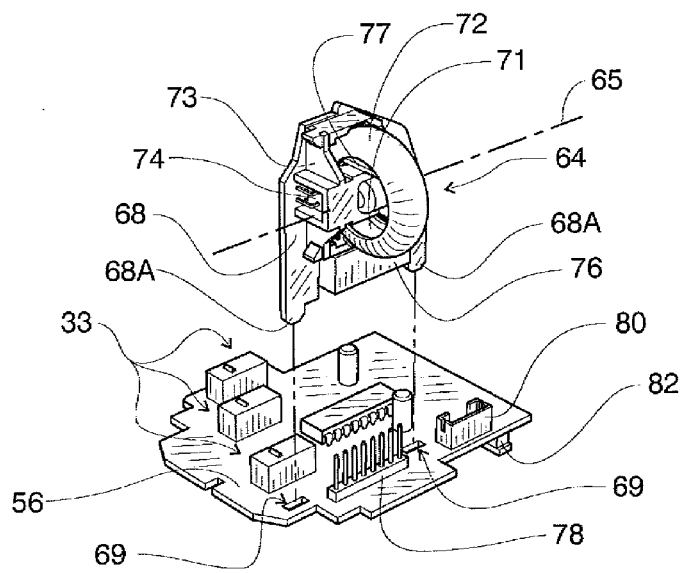
FIG. 18 is an exploded perspective view of the thumbwheel and primary circuit board assembly.

Turning now to the thumbwheel 64 and implementation thereof in one embodiment, it is appreciated that the thumbwheel is mounted such that a portion of the thumbwheel projects through thumbwheel opening or cutout 64A in the shell 52A. See FIGS. 16 and 17. Thumbwheel 64 is mounted on a thumbwheel circuit board 68 as discussed above (see FIG. 18). Thumbwheel 64 is of a known rotating grid type with a cylindrical wheel 71, a soft tire 72, a two piece cage 73, an LED light source 74, an optical detector 75, and a header pin socket 76 mounted to a small circuit board 68. A resilient rub block 77 is mounted as the scroll wheel brake or damper. Rub block 77 provides slight tactile resistance during actuation of thumbwheel 64 and prevents the thumbwheel from drifting when it is not being moved by the user.

Thumbwheel 64 is mounted such that the axis of rotation 65 of the wheel is parallel to the Y-Z plane and intersects the X-Y plane when controller 41 is in the neutral position. Generally, the angle between thumbwheel axis 65 and the assembly plane of the top shell 52A and the bottom shell 52B is approximately 15°. This angulation of axis 65 provides for the axis to extend generally through thumb base 10G, including generally through the metacarpal-carpal joint of the thumb 10B, when hand 10 is engaged with hand receiver or hand engaging surface 41D.

Thumbwheel circuit board 68 is mounted perpendicular to the primary circuit board 56 which is mounted at an angle in the bottom shell 52B of the controller 41 to provide the needed alignment, as discussed above, of rotation axis 65 of thumbwheel 64 and to enable positioning electrical selector switches 33 of primary circuit board 56 as here before described. In addition to the electrical selector switches 33, the primary circuit board 56 carries a header pin array 78 to electrically connect the thumbwheel circuit board 68, a connector 80 for the cable 81, two flexible printed circuit (FPC) connectors 82 and any other applicable and known electronic components.

A ballast weight may be necessary to balance the controller 41 against off-center weight of thumbwheel 64 and selectors 53A, 53B, and 53C and to define a quiescent position of the controller. In one embodiment a weight 97 is provided that fits over a post 98 molded on the inside of bottom shell 52B. Ballast weight 97 compresses two resilient pads 99 mounted on struts formed in bottom shell 52B. See FIGS. 19 and 23. When shells 52A and 52B are secured together as here before described rib 100, positioned above weight 97 provides further retention of weight 97.

As has been discussed above, variations in sizes of various portions of mouse 46 may be made to accommodate different types of users. For example, the dimensions of hand-engaging surface 41B may be optimized for various hand sizes. Likewise, various components having different structural properties may be installed. For example, damping pads 51 may be of various kinds that have different frictional properties. Because controller 41 is supported by ball bearings 42, the frictional damping provided by pads 51 is generally independent of the hand-applied weight. Replacing particular pads 51 with others having more or less frictional resistance with base-engaging surface 40 can provide an increase or decrease of frictional damping, thereby adapting the device to personal preferences. Another example is related to rub block 77 associated with thumbwheel 64. Blocks 77 of varying stiffness may be substituted to match user preference as to tactile resistance, for example. Likewise, different users may prefer different quiescent positions for controller 41 when the controller is not being moved or engaged by the hand. Ballast weights 97 of different sizes may accordingly be utilized.

All references in this description are relative to a right hand version of mouse 46, but the invention also applies to a mirror image version for left-handed use. The current invention is also not limited as to the dispositions of the optical target 48, motion illuminator 84, and the optical motion detector 83. Target 48 could be located on controller 41 with motion illuminator 84 and motion detector 83 being disposed in base 43. Likewise, it would be a matter of design choice to dispose concavity 43A on the underside of controller 41 and toroidal surface 40 on base 43. Additionally, the instant invention is not limited as to the optical method and apparatus for sensing motion described. It is recognized that other forms of motion sensing can be employed without limiting the scope of the present invention.

As used throughout this description, the terms such as top, upper, bottom, lower, and similar gravity-related terms are used only to facilitate description of a particular embodiment in a particular orientation and are not to be understood as limiting the invention as to the orientation of mouse 46.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A computer mouse comprising:
  a. a first subassembly having a concavity;
  b. a second subassembly that includes a convexity having a toroidal surface that projects into the concavity of the first subassembly;
  c. a plurality of bearing elements, each bearing element interposed at least partially between the first and second subassemblies such that one of the subassemblies is supported by the other subassembly and such that relative movement is permitted between the subassemblies;
  d. a motion detection system for detecting motion of one of the first and second subassemblies relative to the other and for generating movement signals;

e. one or more actuators for being contacted by one or more hand digits and for transforming digit motions and a circuit for generating command signals from the motions;
f. a circuit for transmitting movement signals and command signals, and;
g. wherein each subassembly includes one or more of:
   i. a base for being supported by a work surface,
   ii. a controller for being engaged with a hand;
   iii. a portion of the motion detection system, and
   iv. one or more of the actuators.

2. The computer mouse of claim 1 wherein the toroidal surface comprises a curved surface of an outer segment of a ring torus, the segment formed by passing a cutting plane that is parallel to an axis about which the ring torus was generated and the curved surface being disposed on the segment and opposite the cutting plane.

3. The computer mouse of claim 1 wherein the first subassembly comprises the base and the second subassembly comprises the controller.

4. The computer mouse of claim 3 wherein the motion detection system includes an illuminator for illuminating a portion of a target and an optical detector for detecting motion relative to the illuminated portion.

5. The computer mouse of claim 4 wherein the illuminator is disposed on the controller and the target is disposed on the base.

6. The computer mouse of claim 3 wherein the controller includes a hand-engaging surface for receiving a hand where the hand includes a central palm area, knuckle pads, a side palm, a heel, and a thumb base and where the hand-engaging surface includes a raised portion for contacting the central palm and a generally spiral-shaped depressed portion disposed about the raised portion for receiving one or more of the knuckle pads, side palm, heel, and thumb base.

7. The computer mouse of claim 3 wherein the controller includes a hand-engaging surface for receiving a hand where the hand includes a palm and a series of fingers, where surface includes palm-engaging portion, and where one or more of the actuators is disposed on the controller adjacent the palm-engaging portion.

8. The computer mouse of claim 7 wherein the one or more actuators have an actuation arc and wherein when the hand is engaged with the hand-engaging surface, one or more of the fingers is aligned with one of the one or more actuators such that an arc of motion of the finger generally coincides with the actuation arc.

9. The computer mouse of claim 3 wherein the controller includes a hand-engaging surface for receiving a hand where the hand includes a palm and a thumb and where one of the actuators is disposed on a side of the controller, and wherein when the hand is engaged with the hand engaging surface the thumb is in contact with the actuator.

10. The computer mouse of claim 9 wherein one of the actuators is a thumbwheel having an axis of rotation and wherein a longitudinal axis of the thumb intersects the thumbwheel axis of rotation.

11. The computer mouse of claim 1 wherein the first subassembly includes a base having a surrounding wall, and wherein the concavity is disposed interiorly of the surrounding wall; the second subassembly including a hand-actuated controller configured to rest on the base; the hand-actuated controller including an upper hand-engaging surface and a lower toroidal surface that at least partially projects into the concavity of the base; and wherein the plurality of bearing elements are interposed between the base and the toroidal surface of the controller and enable the controller to move relative to the base.

12. The computer mouse of claim 11 wherein the motion detection system includes an illuminator disposed on the controller and a target disposed in the concavity of the base.

13. The computer mouse of claim 11 wherein the upper hand-engaging surface includes a raised palm seat for receiving the palm of a hand and a generally spiral shaped depression extending more than 180 degrees around the raised palm seat and adjoining a thumb area.

14. The computer mouse of claim 13 wherein the one or more actuators include a thumbwheel disposed adjacent and forwardly of the thumb area and a thumbwheel axis about which the thumbwheel is rotatable, and wherein when a hand is operably engaged with the hand receiver the axis that extends generally toward the thumb metacarpal-carpal joint of the hand.

15. A method of communicating hand movement to a computer, comprising:
a. supporting a controller on a base;
b. engaging a hand with the controller;
c. executing a motion of the hand to produce controller movement, the motion consisting of either or both of:
   i. rotating the hand about a longitudinal axis of a computer mouse such that the hand traverses a first circular path, and
   ii. rotating the hand about a transverse axis normal to the longitudinal axis such that the point on the hand traverses a second circular path,
   wherein each of the first and second circular paths includes a radius, and the radius of the first circular path has a length different from a length of the radius of the second circular path;
d. detecting the movement of the controller relative to the base;
e. transforming the movement into data communicable to a computer; and
f. transmitting the data to the computer.

16. The method of claim 15 wherein supporting the controller on the base includes disposing a series of bearing elements within a concavity in the either the base or the controller and contacting a toroidal surface of the controller or the base with the bearing elements.

17. The method of claim 15 wherein engaging the hand with the controller includes contacting a central palm portion of the hand with a raised portion of a hand engaging surface on the controller.

18. The method of claim 15 wherein engaging the hand with the controller includes receiving at least a portion of a palm area that includes one or more of knuckle pads, a side palm, a heel, and a thumb base into a generally spiral-shaped depression in a hand engaging surface of the controller, the spiral shaped depression at least partially surrounding a raised palm portion of the hand-engaging surface.

19. The method of claim 15 including communicating movement of one or more digits of the hand by engaging one of the one or more digits of the hand with an actuator disposed on the controller.

20. The method of claim 19 wherein the digits of the hand include a finger and including pivoting the finger through an arc and moving the actuator, wherein the actuator is configured to move in an arc that coincides with the arc through which the finger is pivoted.

21. The method of claim 19 wherein the digits of the hand include a thumb and the actuator is configured as a thumbwheel having an axis of rotation that intersects a longitudinal axis of the thumb, and wherein the method includes pivoting the thumb and rotating the thumbwheel.

22. The method of claim 15 wherein detecting movement of the controller relative to the base includes illuminating a target on the base and optically detecting movement of the target.

23. A method for supporting a mouse and generating movement signals in response to the movement of the mouse, the method comprising:
   a. placing a hand-actuated controller on a base;
   b. moving the hand-actuated controller relative to the base;
   c. guiding the controller with a toroidal guide surface forming a part of the controller or the base; and
   d. wherein the movement of the controller relative to the base is dictated by the toroidal guide surface.

24. The method of claim 23 wherein the controller is moved by the hand of a person, and wherein the method includes projecting a raised palm seat disposed on the upper surface of the controller into engagement with the palm of a hand and resting other portions of the hand in a generally spiral-shaped depression that extends around a substantial portion of the raised palm seat.

25. The method of claim 23 including stabilizing the controller with one or more friction pads that engage the toroidal guide surface.

* * * * *